United States Patent
Zeng et al.

(10) Patent No.: US 9,286,679 B2
(45) Date of Patent: Mar. 15, 2016

(54) MISALIGNMENT CORRECTION AND STATE OF HEALTH ESTIMATION FOR LANE MANAGEMENT FUSION FUNCTION

(71) Applicant: GM GLOBAL TECHNOLOGY OPERATIONS LLC, Detroit, MI (US)

(72) Inventors: Shuqing Zeng, Sterling Heights, MI (US); Xiaofeng Frank Song, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/338,076

(22) Filed: Jul. 22, 2014

(65) Prior Publication Data

US 2016/0027176 A1 Jan. 28, 2016

(51) Int. Cl.
*G01C 21/34* (2006.01)
*G06T 7/00* (2006.01)
*G06K 9/00* (2006.01)

(52) U.S. Cl.
CPC .......... *G06T 7/0018* (2013.01); *G06K 9/00798* (2013.01)

(58) Field of Classification Search
CPC ........ B60W 30/12; B60W 30/00; B62D 6/00; B60R 2001/1253; B60R 2300/302; G05D 3/00; G02B 2027/014
USPC ........................ 701/23, 28, 300, 301; 348/119
See application file for complete search history.

(56) References Cited

U.S. PATENT DOCUMENTS

| | | | |
|---|---|---|---|
| 7,184,073 B2 * | 2/2007 | Varadarajan et al. | 348/148 |
| 7,898,472 B2 | 3/2011 | Zeng | |
| 8,473,144 B1 * | 6/2013 | Dolgov et al. | 701/28 |
| 8,504,864 B2 | 8/2013 | Menon et al. | |
| 8,605,949 B2 | 12/2013 | Zhang et al. | |
| 2010/0082195 A1 * | 4/2010 | Lee et al. | 701/25 |
| 2010/0250132 A1 | 9/2010 | Zeng | |
| 2013/0253767 A1 | 9/2013 | Lee et al. | |
| 2014/0142800 A1 | 5/2014 | Zeng et al. | |

OTHER PUBLICATIONS

Zeng, Shuqing, U.S. Appl. No. 14/259,470, filed Apr. 23, 2014, entitled "Method of Misalignment Correction and Diagnostic Function for Lane Sensing Sensor".

* cited by examiner

*Primary Examiner* — Dalena Tran

(74) *Attorney, Agent, or Firm* — John A. Miller; Miller IP Group, PLC

(57) ABSTRACT

A method for state of health estimation and misalignment correction in a vehicle lane management system. Two lane sensing systems onboard a vehicle provide lane information to a lane management system, where one of the lane sensing systems may be a dedicated forward-viewing lane sensing system, and the other may use images from a surround-view camera system. The lane information is stored in a fixed-length, moving-window circular data buffer. A correlation coefficient is recursively computed from the lane information from the two lane sensing systems and used to calculate a state of health of the lane management system. A linear regression relationship is also computed between the data from the two lane sensing systems, and the scale factor and offset value are applied to the lane information from the second lane sensing system before a fusion calculation is performed on the lane information from the two lane sensing systems.

20 Claims, 3 Drawing Sheets

MISALIGNMENT CORRECTION AND STATE OF HEALTH ESTIMATION FOR LANE MANAGEMENT FUSION FUNCTION

BACKGROUND OF THE INVENTION

1. Field of the Invention

This invention relates generally to enhanced lane tracking capability of an automobile and, more particularly, to a method for diagnosing and correcting misalignment between two vision-based lane sensing systems which includes computing a correlation between the two lane sensing systems and calibrating one lane sensing system to the other before performing a fusion calculation.

2. Discussion of the Related Art

Many vehicles now include lane sensing systems which employ cameras and image processing technology for determining road lane boundaries by identifying curbs and lane markings in the images. Data from the lane sensing system are typically used in a lane departure warning (LDW) system, which warns a driver of unplanned lane departures, or a lane centering (LC) system, which actively controls steering to maintain a vehicle in the center of a lane.

Some vehicles include two lane sensing systems—for example, a first lane sensing system using images from a forward-view camera and a second lane sensing system using images from a rear-view or surround-view camera. In vehicles with two lane sensing systems, a fusion or combination calculation is sometimes performed, where the fused lane data is used in the LDW system or the LC system.

However, if one of the lane sensing systems develops a misalignment problem, that misalignment will adversely affect the output of the fusion calculation, even if the other lane sensing system is perfectly calibrated. It would be desirable to evaluate and, if necessary, correct the quality of the data from the two lane sensing systems before fusing the data and providing the fused data to downstream systems such as LDW or LC.

SUMMARY OF THE INVENTION

In accordance with the teachings of the present invention, a method is disclosed for state of health estimation and misalignment correction in a vehicle with two lane sensing systems. Two lane sensing systems onboard a vehicle provide lane information to a lane management system, where one of the lane sensing systems may be a dedicated forward-viewing lane sensing system, and the other lane sensing system may use images from a surround-view camera system. The lane information is stored in a fixed-length, moving-window circular data buffer. A correlation coefficient is recursively computed from the lane information from the two lane sensing systems, and the correlation coefficient is used to calculate a state of health of the lane management system. A linear regression relationship is also computed between the lane information from the two lane sensing systems, and the resulting scale factor and offset value are applied to the lane information from the second lane sensing system before a fusion calculation is performed on the lane information from the two lane sensing systems in the lane management system.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for state of health estimation and misalignment correction in a vehicle with two lane sensing systems is merely exemplary in nature, and is in no way intended to limit the invention or its applications or uses.

Lane departure warning (LDW) systems and lane centering (LC) systems are increasingly popular on modern vehicles, as semi-autonomous driving becomes a desirable and achievable goal. In order to provide accurate and timely warnings or steering corrections, LDW and LC systems rely on data from a lane management system—which determines a vehicle's position in a lane in real time. In some vehicles, the lane management system combines input from two independent lane sensing systems in a lane management fusion ring.

Figure 1:
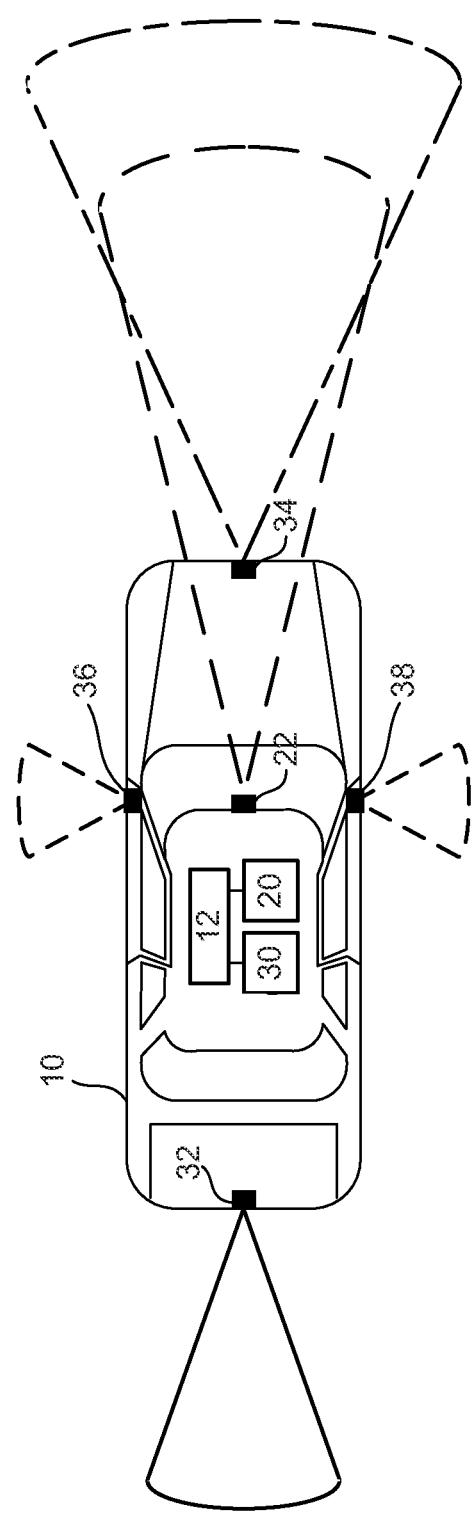
FIG. 1 is a schematic diagram of a vehicle with a lane management system including two lane sensing systems.

FIG. 1 is a schematic diagram of a vehicle 10 including a lane management system 12 which receives lane information from a first lane sensing system 20 and a second lane sensing system 30. The first lane sensing system 20 receives images from a front camera 22, which can detect many different types of objects in front of the vehicle 10. The front camera 22 may detect both left and right lane boundary markers, leading vehicles and curbs, and the lane sensing system 20 uses these detected objects in a calculation to determine lane information for the vehicle 10. The lane information which is calculated by the lane sensing system 20 includes lateral offset of the vehicle 10 relative to the center of the lane, heading of the vehicle 10 relative to a tangent to the lane, and curvature of the lane. In some vehicles, the lane sensing system 20 may be considered the primary lane sensing system, as the front camera 22 may be dedicated to and optimized for lane sensing.

The lane sensing system 30—which may be considered a secondary lane sensing system—uses images from one or more other cameras to compute an independent set of lane information for the vehicle 10. The lane sensing system 30 may receive images only from a rear-view camera 32. Alternatively, the lane sensing system 30 may be a "surround-view" system which receives images from the rear-view camera 32, a second front camera 34, a left-side camera 36 and a right-side camera 38. Other cameras or combinations of cameras may also be used as input to the lane sensing system 30. The lane management system 12, receiving lane information from the lane sensing system 20 and the lane sensing system 30, performs a fusion calculation which yields a set of fused lane information which can be used by the LDW or LC system.

The lane sensing systems 20 and 30 can develop calibration or misalignment issues—for example, if a camera gets displaced or rotated out of position due to vehicle body damage. As mentioned earlier, fusing uncalibrated lane information from two lane sensing systems may introduce unwanted errors into the fused lane data. It is therefore desirable, before fusing the two sets of lane information in the lane management system 12, to determine the state of health of the lane sensing system 20 and the lane sensing system 30 and correct any misalignment. An overall state of health for the lane management system 12 can also be calculated. Methods for performing all of these calculations are discussed below.

It is to be understood that the lane management system 12, the lane sensing system 20 and the lane sensing system 30 are comprised of at least a processor and a memory module, where the processors are configured with software designed to compute lane information from the camera images, determine lane management system state of health, correct any lane sensing system misalignment, and perform a lane information fusion calculation. The logic and calculations used in the lane management system 12 will be discussed in detail below.

It is to be further understood that the features and calculations of the lane management system 12, the first lane sensing system 20 and the second lane sensing system 30 could be divided up differently than described herein without departing from the spirit of the disclosed invention. For example, only the images could be processed in the lane sensing systems 20 and 30, and all lane information, alignment, state of health and fusion calculations could take place in the lane management system 12. Alternatively, all image processing and subsequent calculations could be performed in a single processor in the lane management system 12. That is, all lane sensing and management functions could be performed in a single physical device.

In computing an overall state of health for the lane management system 12, and calculating any misalignment between the lane sensing system 20 and the lane sensing system 30, a number of calculations will be performed on the lane information from the lane sensing system 20 and the lane information from the lane sensing system 30. The lane information calculations in the lane sensing systems 20 and 30 are based on a sequence of images from the cameras 22 and 32-38. In one exemplary embodiment, new lane information may be calculated every 100 ms, although longer or shorter time steps may also be used. Rather than dealing with an ever-increasing buffer of past lane information data, a fixed length buffer may be used in the calculations. The buffer may include thousands of past sets of lane information (time steps), but by virtue of being a fixed length, it offers the advantage of a constant complexity of the correlation and other calculations.

Figure 2:
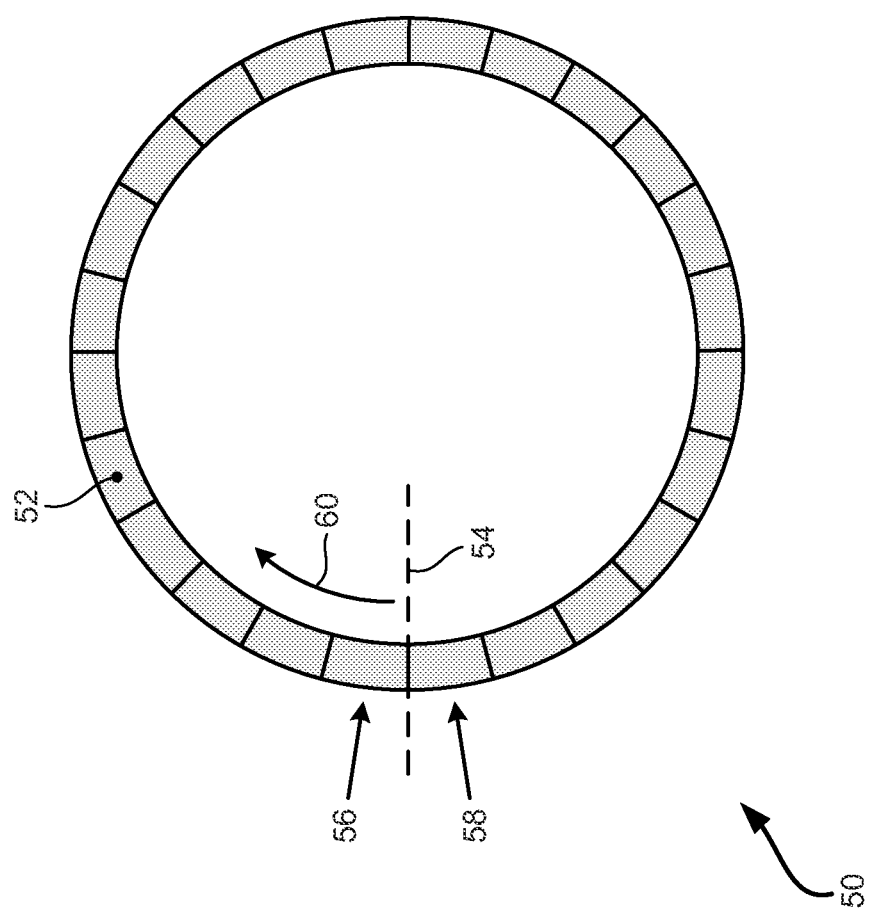
FIG. 2 is an illustration of a circular data buffer which is used in the disclosed method for lane management system state of health determination.

It is helpful to think of the fixed length buffer as a circular buffer. FIG. 2 is an illustration of a circular data buffer 50 which is used in the disclosed method for determining lane management system state of health. Consider the data buffer 50 as containing a series of many time steps 52 of lane information x from the lane sensing system 20, where x at each of the time steps 52 includes lateral offset, heading and curvature as described previously. Dashed line 54 represents the beginning and ending location for the circular data buffer 50. The newest time step—that is, the lane information most recently provided by the lane sensing system 20, is contained in a buffer head 56. The oldest time step is contained in a buffer tail 58. At each time step, a new set of lane information is placed in the buffer head 56, all of the time steps 52 rotate one position clockwise in the buffer 50 (as shown by arrow 60), and the lane information which was previously contained in the buffer tail 58 drops out of the buffer 50. Another circular data buffer such as the buffer 50 is also used to store the data from the second lane sensing system 30.

In the manner described above, the circular data buffer 50 always contains a moving window of the most recent lane information. The number of the time steps 52 contained in the buffer 50 is defined as W (where W may be in the thousands, as mentioned previously). Thus, for the lane sensing system 20, the contents of the buffer 50 can be defined as:

$$X = \{x_{t-W+1}, \ldots, x_t\} \quad (1)$$

Where $x_t$ is the lane information from the lane sensing system 20 for the current time t (in the buffer head 56), $x_{t-W+1}$ is the lane information for the oldest time step which remains in the buffer 50 (in the buffer tail 58), and X is the vector containing the entire buffer of lane information from the first lane sensing system 20.

Similarly, the vector Y containing the entire buffer of lane information from the second lane sensing system 30 can be defined as $Y = \{y_{t-W+1}, \ldots, y_t\}$.

In order to determine an overall state of health of the lane management system 12, it is first necessary to compute a correlation between the lane information from the lane sensing system 20 and the lane information from the lane sensing system 30. This correlation can be determined by calculating the Pearson's correlation coefficient, which is a measure of the strength and direction of the linear relationship between two variables that is defined as the covariance of the variables divided by the product of their standard deviations. That is, the Pearson's correlation coefficient is defined as:

$$\rho(X, Y) = \frac{\text{cov}(X, Y)}{\sigma_X \sigma_Y} = \frac{E(X - \mu_X)(Y - \mu_Y)}{\sigma_X \sigma_Y} \quad (2)$$

Where cov is the covariance, $\sigma_X$ is the standard deviation of X, $\mu_X$ is the mean of X, (similarly for Y), and E is the expectation.

When the vectors X and Y are represented by a set of W samples or time steps in the circular data buffer 50, the Pearson's correlation coefficient can be computed recursively on the moving window of lane information, as follows:

$$\rho(X, Y) = \frac{W \Sigma x_i y_i - \Sigma x_i \Sigma y_i}{\sqrt{W \Sigma x_i^2 - (\Sigma x_i)^2} \sqrt{W \Sigma y_i^2 - (\Sigma y_i)^2}} \quad (3)$$

where all of the variables in Equation (3) have been defined above, and the summations are all taken over all of the time steps i in the data buffer 50.

Equation (3) can be simplified and rewritten in the following form:

$$\rho(X, Y) = \frac{WA - BC}{\sqrt{WD - B^2} \sqrt{WE - C^2}} \quad (4)$$

where the variables A through E are defined, as can be seen by comparing Equations (3) and (4), as follows:

$$A = \Sigma_{i=t-W+1}^{t} x_i y_i \quad (5)$$

$$B = \Sigma_{i=t-W+1}^{t} x_i \quad (6)$$

$$C = \Sigma_{i=t-W+1}^{t} y_i \quad (7)$$

$$D = \Sigma_{i=t-W+1}^{t} (x_i)^2 \quad (8)$$

$$E = \Sigma_{i=t-W+1}^{t} (y_i)^2 \quad (9)$$

Again, what is being done here is that the variables involving the lane information for each time step ($x_i$ for the first lane sensing system 20, and $y_i$ for the second lane sensing system 30) are being summed for the entire content of the circular data buffer 50, from the oldest (tail) time step at i=t−W+1 to the newest (head) time step at i=t. Computing the variables A through E and solving Equation (4) yields the Pearson's correlation coefficient ρ for the vectors X and Y. These calculations are repeated at each time step as new lane information is pushed into the buffer head 56 and the oldest lane information is evicted from the buffer tail 58.

By definition, Pearson's correlation coefficient has a value between zero and 1, inclusive (0≤ρ≤1). The value of ρ would be equal to zero if the vectors X and Y have no statistical correlation, and ρ would have a value of one if the vectors X and Y are equal (X=Y). In evaluating the state of health of the lane management system 12, the Pearson's correlation coefficient ρ can be compared to a predetermined threshold value, such as 0.6, to confirm that the vectors X and Y have at least a certain minimum level of correlation. If the Pearson's correlation coefficient does not meet or exceed the threshold, then a warning message may be provided to the driver that the lane management system 12 needs to be serviced, and downstream applications such as lane departure warning and lane centering may be disabled.

After computing the Pearson's correlation coefficient ρ(X, Y) at each time step, it is useful to calculate a state of health value for the lane management system 12, which may be defined as:

$$\text{SOH}(lms_{12}) = \alpha \rho(X,Y) + \beta \text{SOH}(lss_{20}) + \gamma \text{SOH}(lss_{30}) \quad (10)$$

where $\text{SOH}(lms_{12})$ is the state of health of the lane management system 12, $\text{SOH}(lss_{20})$ is the state of health of the lane sensing system 20, $\text{SOH}(lss_{30})$ is the state of health of the lane sensing system 30, and α, β and γ are normalized weighting factors which can be defined in any suitable manner.

In Equation (10), the three state of health variables, which range in value from zero to one, can be viewed as probabilities that the system is healthy. For example, a value of SOH $(lms_{12})=1$ means that there is a 100% probability that the lane management system 12 is healthy, while a value of SOH $(lms_{12})=0$ means that there is a 0% probability that the lane management system 12 is healthy. Likewise for the lane sensing system 20 and the lane sensing system 30. Similarly, the weighting factors α, β and γ can be viewed as conditional probabilities. For example, β can be defined as the conditional probability that the lane management system 12 is healthy when the (front) lane sensing system 20 is healthy (that is, when $\text{SOH}(lss_{20})=1$).

If Equation (10) is to be used with non-zero values of β and γ, then a state of health must be independently computed for each of the lane sensing system 20 ($\text{SOH}(lss_{20})$) and the lane sensing system 30 ($\text{SOH}(lss_{30})$). Alternatively, if independent state of health values for the lane sensing system 20 and the lane sensing system 30 are not available, then the state of health of the lane management system 12 could simply be defined as the Pearson's correlation coefficient ρ(X, Y) itself, which is the solution of Equation (10) when α=1 and β=γ=0.

The lane information from the lane sensing system 20 and the lane sensing system 30, contained in the vectors X and Y, respectively, can also be used for calibration. For example, if the state of health and the alignment of the lane sensing system 20 can be independently verified—such as by calibrating the lane information from the lane sensing system 20 to lane data computed by a radar-based or lidar-based object detection system—then it would be desirable to automatically calibrate the lane information Y from the lane sensing system 30 to the lane information X from the lane sensing system 20. This can be done by assuming that the lane information from the lane sensing system 20 and the lane sensing system 30 are related as Y=aX+b, where a is a scale factor and b is an azimuth angle of misalignment.

The values of a and b can be computed recursively using the moving-average data in the circular data buffer 50. Specifically:

$$a = \frac{BC - AW}{B - W} \quad (11)$$

and $$b = \frac{A - C}{B - W} \quad (12)$$

Where, as defined previously, W is the number of time steps in the circular data buffer 50, and A, B and C are the intermediate variables defined above in Equations (5)-(7) using the summations on the lane information $x_i$ and $y_i$.

After computing a and b, a correction can be applied to the lane information from the lane sensing system 30, to produce a corrected vector Y', as follows:

$$Y' = \frac{Y - b}{a} \quad (13)$$

After computing Y', the lane information from the lane sensing system 20, X, and the corrected lane information from the lane sensing system 30, Y', can be used in a fusion calculation in the lane management system 12. The pre-calibrated, fused lane data can then be used for lane departure warning or lane centering, as discussed previously.

Figure 3:
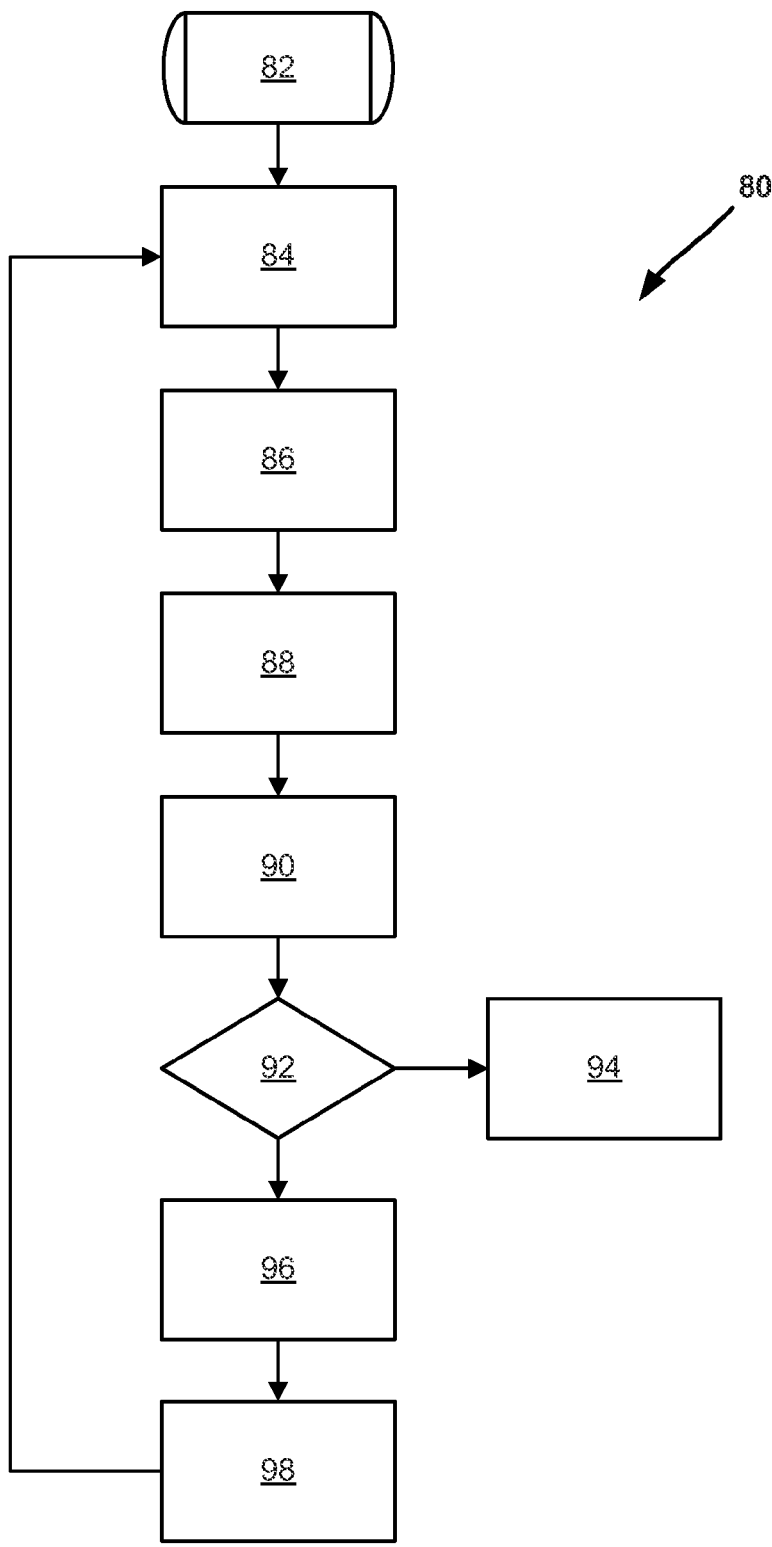
FIG. 3 is a flowchart diagram of a method for state of health estimation and misalignment correction in a vehicle with two lane sensing systems.

FIG. 3 is a flowchart diagram 80 of a method for state of health estimation and misalignment correction of the lane management system 12 and the lane sensing systems 20 and 30. At start box 82, the process is initiated, such as when the vehicle 10 is started. At box 84, new lane information is provided by the lane sensing system 20 and the lane sensing system 30. The lane information from each of the lane sensing systems is accumulated in a separate instance of the circular data buffer 50, as discussed previously. After start-up, the process does not continue from the box 84 until a sufficient number of time steps of data are available to perform the recursive calculations discussed above.

At box 86, any misalignment of the first lane sensing system 20 is computed and corrected. The alignment of the lane sensing system 20 can be validated by comparison to lane data from a forward object detection system, for example, as discussed previously. At box 88, the correlation coefficient is calculated using the data from the two lane sensing systems. As discussed previously, the intermediate variables A-E are first calculated using the data in the buffer 50, and then the Pearson's correlation coefficient ρ(X, Y) is calculated using Equation (4).

At box 90, the state of health of the lane management system 12 is computed, using Equation (10). At decision diamond 92, the state of health of the lane management system 12 is compared to a predetermined threshold value, such as 0.6. If the state of health of the lane management system 12 is less than the threshold value, then at box 94 a warning message is issued reporting a possible fault condition in the lane management system 12. The warning message could be issued to the driver of the vehicle 10, or the warning message could be transmitted via a telematics system to a service center of the vehicle manufacturer, or both. If the lane management system 12 is determined to be in a fault condition at the box 94, then downstream applications which use the fused lane data, such as LDW and LC, are disabled.

If the state of health of the lane management system 12 is not less than the threshold value, then at box 96 the variables a and b for the linear regression Y=aX+b are calculated using Equations (11) and (12), and the corrected lane information vector Y' for the lane sensing system 30 is calculated using Equation (13). At box 98, a fusion calculation is performed on the lane information vector X for the lane sensing system 20 and the corrected lane information vector Y' for the lane sensing system 30. The pre-corrected, fused lane information calculated at the box 98 is provided by the lane management system 12 to downstream applications, such as LDW and LC. After calculating the fused lane information at the box 98, the process returns to the box 84 where new lane information is provided, the circular data buffer 50 is indexed, and the process continues recursively.

Using the methods disclosed herein, the state of health of the lane management system 12 can be evaluated in real time, and the lane information from two lane sensing systems can be pre-calibrated to correct any misalignment before fusing the data. By pre-correcting the lane data before fusion, the accuracy of the data provided to downstream LDW and LC systems is improved, as unwanted errors are not introduced into the fused lane data. Furthermore, the real-time monitoring of lane management system state of health enables immediate detection of any problems with either of the onboard lane sensing systems.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for state of health estimation and misalignment correction in a vehicle lane management system, said method comprising:
   providing lane information for a vehicle from a first lane sensing system and a second lane sensing system onboard the vehicle, where the lane information is stored as a plurality of time steps in a circular data buffer;
   calibrating the lane information from the first lane sensing system based on an independent source of lane data, where the independent source is not the second lane sensing system;
   computing, using a microprocessor, a correlation coefficient between the lane information from the first lane sensing system and the lane information from the second lane sensing system;
   computing a state of health of the lane management system based on the correlation coefficient;
   comparing the state of health of the lane management system to a predetermined threshold value, and issuing a warning message if the state of health is less than the threshold value;
   computing a linear regression relationship, including a scale factor and an offset value, between the lane information from the first lane sensing system and the lane information from the second lane sensing system;
   correcting the lane information from the second lane sensing system using the scale factor and the offset value; and
   fusing the lane information from the first lane sensing system with the lane information from the second lane sensing system after correcting.

2. The method of claim 1 wherein the lane information includes a lateral offset of the vehicle from a center of a lane, a heading angle of the vehicle relative to the lane, and a curvature of the lane.

3. The method of claim 1 wherein the circular data buffer has a size capable of storing a fixed number of the time steps, the circular data buffer stores a most recent time step of the lane information in a buffer head location, and lane information older than the fixed number of the time steps is evicted from the circular data buffer.

4. The method of claim 1 wherein computing a correlation coefficient includes computing a Pearson's correlation coefficient between the lane information from the first lane sensing system and the lane information from the second lane sensing system, where the Pearson's correlation coefficient is recursively calculated using a moving window of the lane information from the circular data buffer.

5. The method of claim 4 wherein the Pearson's correlation coefficient is recursively calculated using an equation which represents an expectation function, lane information mean values and lane information standard deviations in terms of summations, squares of summations, and summations of squares, of all of the time steps of the lane information in the circular data buffer.

6. The method of claim 1 wherein computing a state of health of the lane management system includes using a weighted sum of the correlation coefficient, a state of health of the first lane sensing system and a state of health of the second lane sensing system.

7. The method of claim 1 wherein computing a linear regression relationship between the lane information from the first lane sensing system and the lane information from the second lane sensing system includes recursively computing the scale factor and the offset value using a moving window of the lane information from the circular data buffer.

8. The method of claim 7 wherein the scale factor and the offset value are recursively calculated using equations which include summations, squares of summations, and summations of squares, of all of the time steps of the lane information in the circular data buffer.

9. The method of claim 1 further comprising using the lane information after fusing in a lane centering system on the vehicle.

10. The method of claim 1 wherein the first lane sensing system is a forward-view lane sensing system and the second lane sensing system determines lane information using images from a surround-view camera system.

11. A method for state of health estimation and misalignment correction in a vehicle lane management system, said method comprising:
   providing lane information for a vehicle from a first lane sensing system and a second lane sensing system onboard the vehicle, where the first lane sensing system is a forward-view lane sensing system and the second lane sensing system determines lane information using images from a surround-view camera system, and where the lane information is stored as a plurality of time steps in a circular data buffer;
   calibrating the lane information from the first lane sensing system based on lane data derived from a forward object detection system;

computing, using a microprocessor, a Pearson's correlation coefficient between the lane information from the first lane sensing system and the lane information from the second lane sensing system;

computing a state of health of the lane management system based on the correlation coefficient;

comparing the state of health of the lane management system to a predetermined threshold value, and issuing a warning message if the state of health is less than the threshold value;

computing a linear regression relationship, including a scale factor and an offset value, between the lane information from the first lane sensing system and the lane information from the second lane sensing system, including recursively computing the scale factor and the offset value using a moving window of the lane information from the circular data buffer;

correcting the lane information from the second lane sensing system using the scale factor and the offset value; and fusing the lane information from the first lane sensing system with the lane information from the second lane sensing system after correcting.

12. The method of claim 11 wherein the Pearson's correlation coefficient is recursively calculated using an equation which represents an expectation function, lane information mean values and lane information standard deviations in terms of summations, squares of summations, and summations of squares, of all of the time steps of the lane information in the circular data buffer.

13. The method of claim 11 wherein computing a state of health of the lane management system includes using a weighted sum of the Pearson's correlation coefficient, a state of health of the first lane sensing system and a state of health of the second lane sensing system.

14. A vehicle lane management system including state of health estimation and misalignment correction, said lane management system comprising:

a first lane sensing system and a second lane sensing system onboard a vehicle, said lane sensing systems providing lane information for the vehicle on a road;

a memory module for storing the lane information received from the lane sensing systems, said memory module including a circular data buffer in which the lane information is stored as a plurality of time steps; and a lane management processor in communication with the memory module, said lane management processor configured to:

calibrate the lane information from the first lane sensing system based on an independent source of lane data, where the independent source is not the second lane sensing system;

compute a correlation coefficient between the lane information from the first lane sensing system and the lane information from the second lane sensing system;

compute a state of health of the lane management system based on the correlation coefficient;

compare the state of health of the lane management system to a predetermined threshold value, and issue a warning message if the state of health is less than the threshold value;

compute a linear regression relationship, including a scale factor and an offset value, between the lane information from the first lane sensing system and the lane information from the second lane sensing system;

correct the lane information from the second lane sensing system using the scale factor and the offset value; and fuse the lane information from the first lane sensing system with the lane information from the second lane sensing system after correcting.

15. The lane management system of claim 14 wherein the circular data buffer has a size capable of storing a fixed number of the time steps, the circular data buffer stores a most recent time step of the lane information in a buffer head location, and lane information older than the fixed number of the time steps is evicted from the circular data buffer.

16. The lane management system of claim 14 wherein the correlation coefficient is a Pearson's correlation coefficient between the lane information from the first lane sensing system and the lane information from the second lane sensing system, where the Pearson's correlation coefficient is recursively calculated using a moving window of the lane information from the circular data buffer.

17. The lane management system of claim 16 wherein the Pearson's correlation coefficient is recursively calculated using an equation which represents an expectation function, lane information mean values and lane information standard deviations in terms of summations, squares of summations, and summations of squares, of all of the time steps of the lane information in the circular data buffer.

18. The lane management system of claim 14 wherein the state of health of the lane management system is calculated with an equation including a weighted sum of the correlation coefficient, a state of health of the first lane sensing system and a state of health of the second lane sensing system.

19. The lane management system of claim 14 wherein the scale factor and the offset value are recursively computed using a moving window of the lane information from the circular data buffer using equations which include summations, squares of summations, and summations of squares, of all of the time steps of the lane information in the circular data buffer.

20. The lane management system of claim 14 wherein the first lane sensing system is a forward-view lane sensing system and the second lane sensing system determines lane information using images from a surround-view camera system.

* * * * *